(No Model.) 2 Sheets—Sheet 1.

J. F. HUBBARD.
MILK COOLER.

No. 577,579. Patented Feb. 23, 1897.

WITNESSES:

INVENTOR
James F. Hubbard.
BY
ATTORNEY.

(No Model.) 2 Sheets—Sheet 2.
J. F. HUBBARD.
MILK COOLER.
No. 577,579. Patented Feb. 23, 1897.
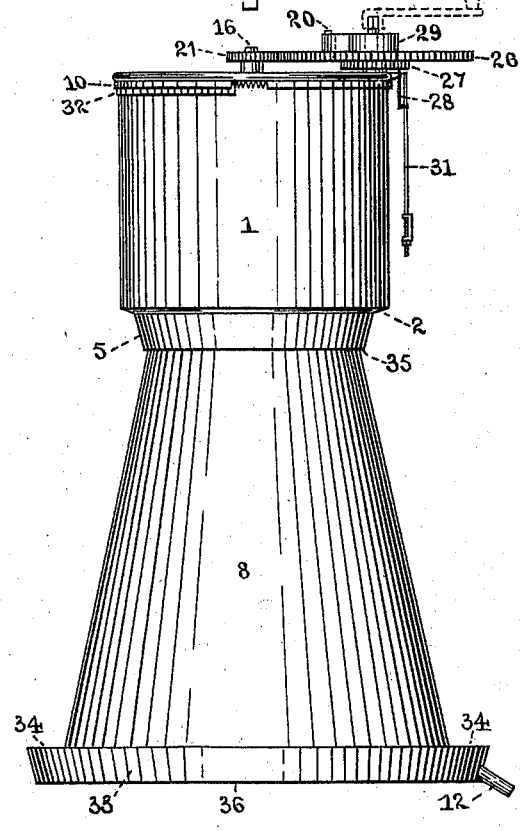
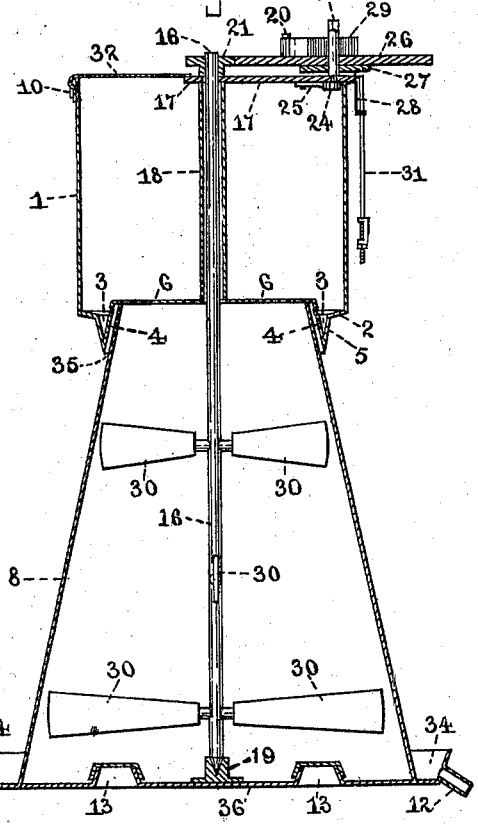
WITNESSES:
INVENTOR
James F. Hubbard
BY
Ben. R. Hayar
ATTORNEY.

UNITED STATES PATENT OFFICE.

JAMES F. HUBBARD, OF BRADFORD, PENNSYLVANIA.

MILK-COOLER.

SPECIFICATION forming part of Letters Patent No. 577,579, dated February 23, 1897.

Application filed July 19, 1895. Serial No. 556,529. (No model.)

*To all whom it may concern:*

Be it known that I, JAMES F. HUBBARD, a citizen of the United States, residing in Bradford, in the county of McKean and State of Pennsylvania, have invented new and useful Improvements in Reservoirs for Milk-Coolers, of which the following is a specification.

My invention relates to that class of reservoirs for milk-coolers in which the milk is sprayed against a cooling-chamber.

The objects of my invention are to provide an apparatus that will instantaneously deodorize fresh milk, as well as expel the animal heat therefrom, that is simple to operate and easily cleaned, and one that will discharge all the milk from the reservoir against the cooling-chamber, so that there will be no waste in operating the same. I attain these objects by the apparatus illustrated in the accompanying drawings, in which—

Figure 1:
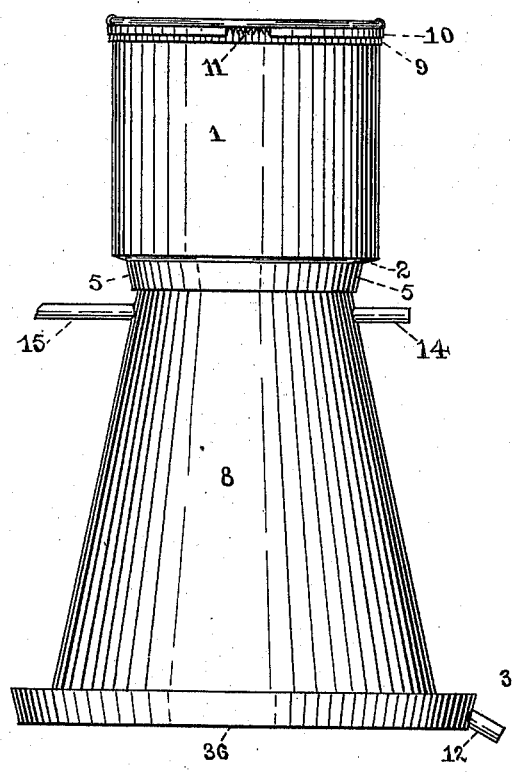
Figure 2:
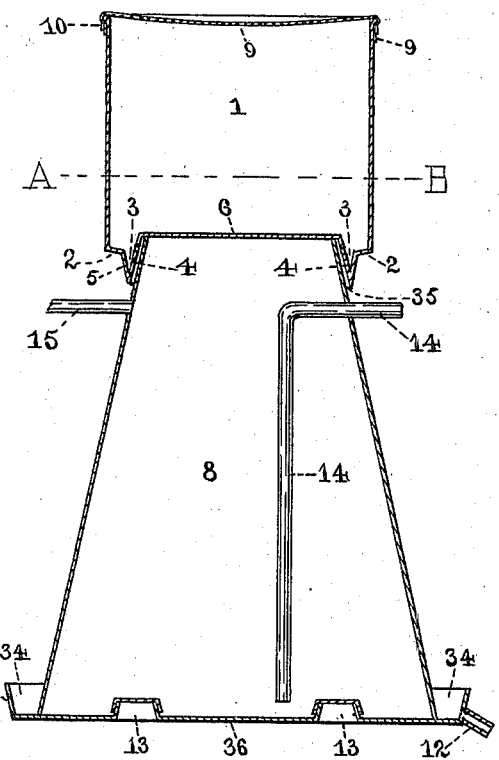
Figure 3:
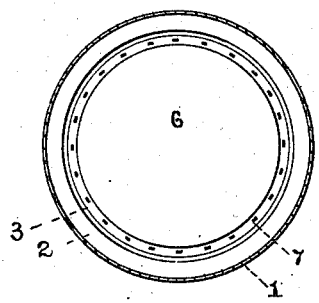
Figure 4:
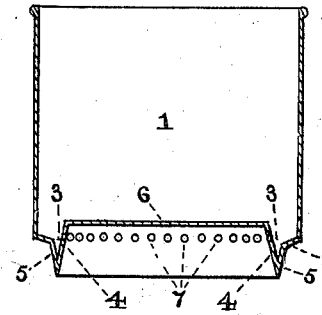

Figure 1 represents an elevation of my improved reservoir for milk-coolers in connection with a cooling-chamber provided with pipe connections for the purpose of using running water as a cooling medium. Fig. 2 represents an axial cross-section view of Fig. 1. Fig. 3 represents a cross-section view of the reservoir for milk-coolers through the dotted line A B of Fig. 2. Fig. 4 represents an axial cross-section of the milk-receiver. Fig. 5 represents an elevation of my reservoir for milk with the cooling-chamber provided with fans for the purpose of cooling, said fans being operated by a spring-motor. Fig. 6 represents an axial cross-section of Fig. 5 and shows the fans and fan-spindle in connection with the spring-motor. Fig. 7 represents the T-plate on top of the reservoir for milk, through which the fan-spindle passes and in which the gudgeon of the spring-motor is movably secured. Fig. 8 represents a top view of my reservoir for milk and shows the spring-motor placed on top thereof.

Similar numerals refer to similar parts throughout the several views.

In the drawings, numeral 1 is the reservoir for milk, consisting of a cylindrical vessel made, preferably, of sheet-tin, the bottom being constructed with a portion 2, having a downward slope from the outer case to the V-shaped annular groove 3, the inner side 4 being of greater breadth than the outer side 5 of the annular groove 3. Connected to or integral with the side 4 is the circular disk 5. The side 4 is also provided with the perforations 7.

The object of the bottom of the milk-receiver being so constructed is to give the milk when discharging therefrom a centripetal movement, thereby insuring the discharge of the milk against the cooling-chamber 8 at its top and thereby forming a film which flows along the face of the cooling-chamber into the annular trough 34.

The sieve 9 is held in place by the band 10 and spring 11.

The reservoir 1 for milk rests upon and is sustained by the cooling-chamber 8, which is of a truncated-cone-shaped form, open at its upper end and of less diameter at the top than the circular recess formed by the side 4 of the annular groove 3 in the bottom of the reservoir 1 for milk, thereby creating the annular space 35 when the reservoir 1 for milk and the cooling-chamber 8 are connected. The bottom 36 extends beyond the periphery of the lower part of the cooling-chamber 8 and has its edge 33 turned up so as to form the annular trough 34, which latter is provided with the spout 12. The bottom 36 is also provided with one or more orifices 13 for the purpose of draining when water is used and when the fans 20 are used (see Fig. 6) to allow a free passage of air into the cooling-chamber 8.

Figs. 1 and 2 show the cooling-chamber 8 arranged for the use of water, and is provided with the inlet-pipe 14, which extends down near the bottom 36, and the outlet-pipe 15 inserted near the top.

In Figs. 5 and 6, 16 is a spindle which passes through the T-plate 7 (see Fig. 7) and the tube 18, which latter is secured in the center of the reservoir 1 for milk, and thence passes down through the cooling-chamber 8 and has its bearing in the foot-box 19. The object of the tube 18 is to prevent the milk from escaping into the cooling-chamber 8, and also to furnish to it a passage-way for the egress of the air that has been utilized, the fans being set at such a bevel as to draw the air through the orifices 13 and discharge it through the tube 18. To the spindle 16, within the cooling-chamber 8, is attached a series of fans 30, and at its upper end is secured the pinion 21 by a set-screw or any similar device that can be readily loosened, as it is necessary to disconnect the pinion 21 from the spindle 16 in order to separate the milk-reservoir 1 from the cooling-chamber 8.

To the T-plate 17 at the aperture 22 (see Fig. 7) is movably secured the gudgeon 23. Fixedly secured to the gudgeon 23 is the ratchet-wheel 24, which is provided with the spring-pawl 25. Running loose on the gudgeon 23 and meshing with the pinion 21 is the cog-wheel 26, underneath which is secured or integral therewith the escape-wheel 27, on which the verge 28 acts. This latter, together with the pendulum 31, is pivoted to the T-plate 17.

29 is a flat spring fixedly secured to the gudgeon 23 at its inner end, its outer end being secured to the post 20, which latter is fixedly secured to the cog-wheel 26.

32 is a segment-shaped sieve attached to the plate 17 and secured to the reservoir 1 for milk by means of the band 10.

In using my apparatus, as shown in Figs. 1 and 2, the inlet-pipe 14 is connected at its upper end to a supply of running water, thereby filling the cooling-chamber up to the outlet-pipe, through which it is discharged. The fresh milk is poured into the reservoir 1 for milk through the strainer 9 and passes out through the perforations 7 in the annular groove 3, and they being in nearly a vertical plane cause the milk to be discharged against the cooling-chamber 8 with a centripetal movement, thereby preventing any waste of milk. The milk on striking the cooling-chamber spreads in a thin sheet and flows into the annular trough and out through the spout 12 into whatsoever vessel may be provided for receiving the same.

In many instances running water is not available, for which reason in place of the water-pipe connections I substitute fans as a cooling medium, and for family use I have provided a spring-motor for driving them. In large dairies and cheese-factories any motive power may be substituted.

I am aware that prior to my invention milk-coolers have been made of a truncated-cone form with milk-reservoirs having perforations in their bottoms. Said perforations, however, either discharge the milk downward in a vertical direction or outwardly with a centrifugal movement, and in either instance I find from actual experiments that some of the fine streams of the discharged milk will take a course away from the cooler, thereby creating a waste as well as soiling the surrounding floor. I therefore do not claim such a combination broadly, but What I do claim as my invention, and desire to secure by Letters Patent, is—

The combination with a reservoir for milk provided with the bottom formed with the sloping ring 2, the V-shaped annular groove having a series of perforations on the inner side thereof and the disk 6, of the cooling-chamber provided with a centrally-located foot-box, and a shaft provided with fans, substantially as shown and for the purpose described.

JAMES F. HUBBARD.

Witnesses:
R. W. EDGETT,
A. P. LORD.